Aug. 18, 1970    P. H. GAITHER IV    3,524,988
PROCESS AND APPARATUS FOR EVALUATING FABRIC APPEARANCE
Filed Nov. 16, 1967    4 Sheets-Sheet 1

INVENTOR
PAUL H. GAITHER, IV

BY  *Eugene Berman*

AGENT

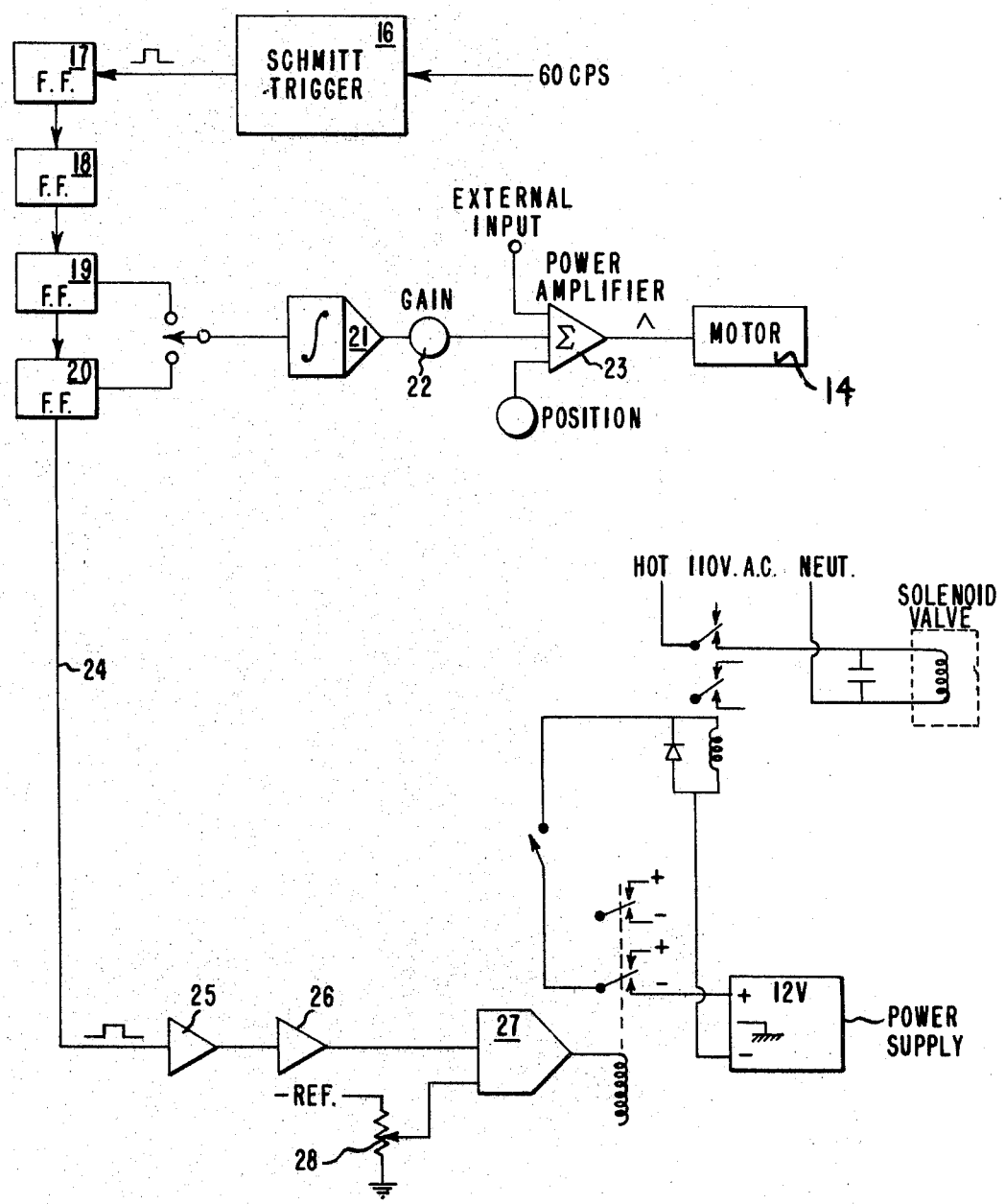

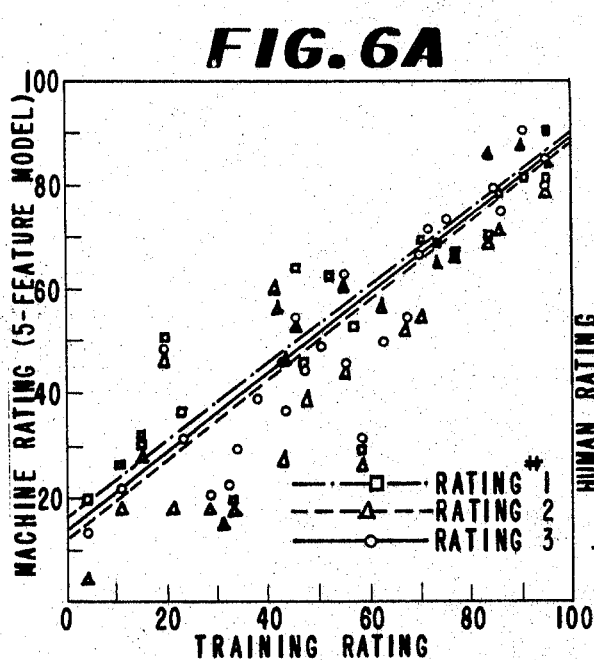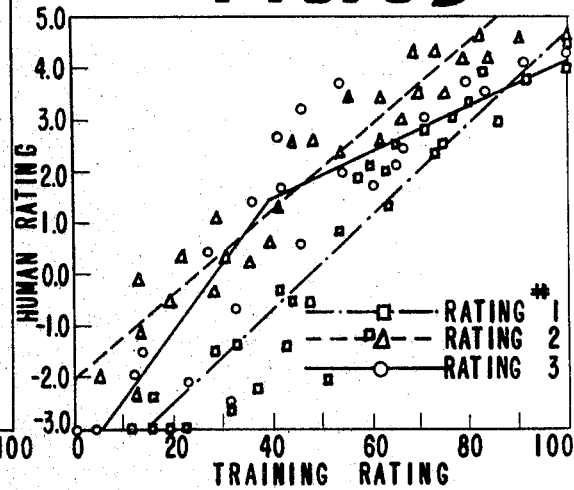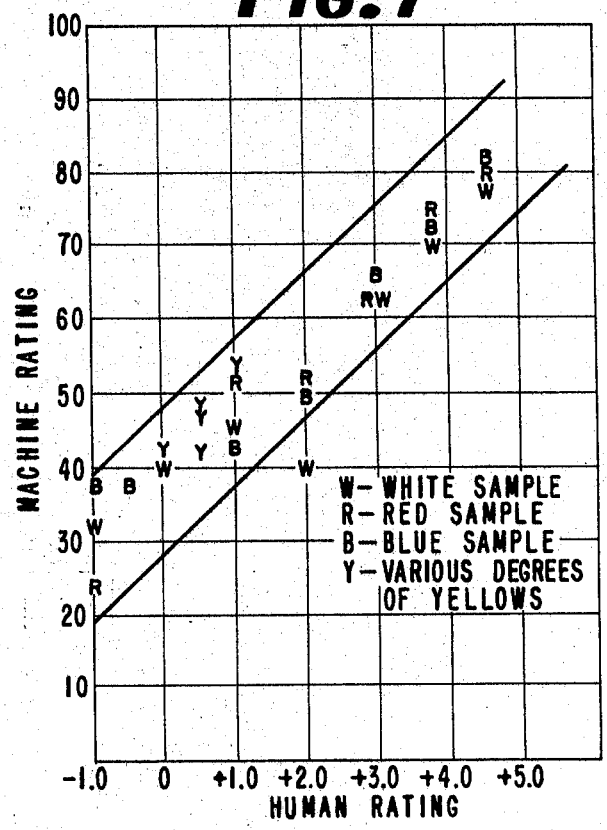

Aug. 18, 1970     P. H. GAITHER IV     3,524,988
PROCESS AND APPARATUS FOR EVALUATING FABRIC APPEARANCE
Filed Nov. 16, 1967     4 Sheets-Sheet 4
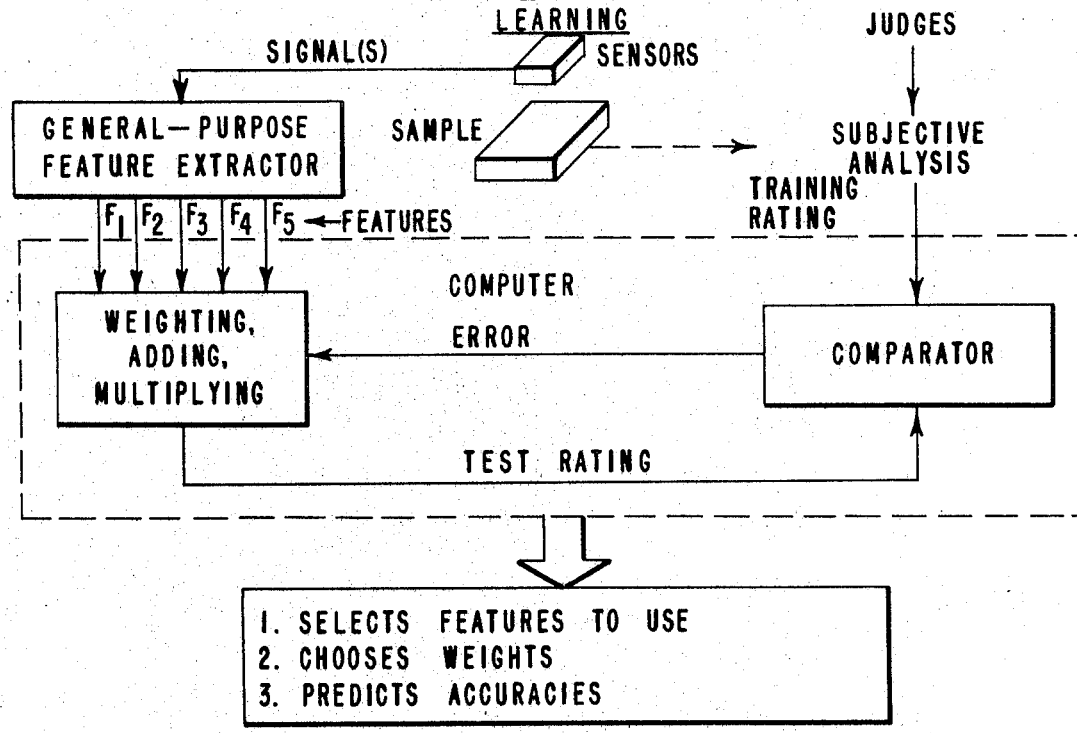
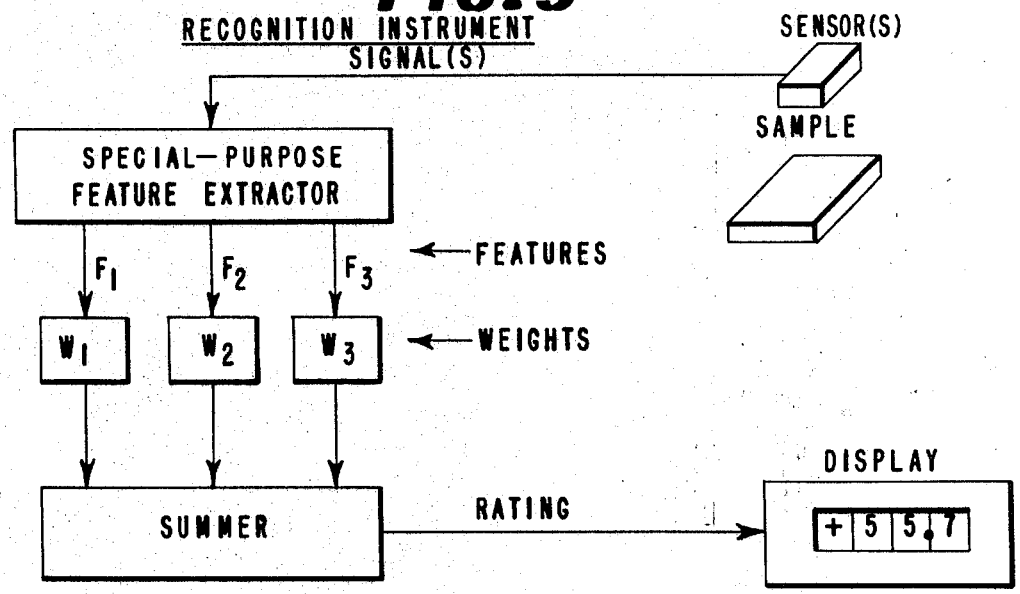
INVENTOR
PAUL H. GAITHER, IV
BY    Eugene Berman
AGENT United States Patent Office 3,524,988
Patented Aug. 18, 1970

3,524,988
PROCESS AND APPARATUS FOR EVALUATING FABRIC APPEARANCE
Paul H. Gaither IV, New Castle County, Del., assignor to E. I. du Pont de Nemours and Company, Wilmington, Del., a corporation of Delaware
Filed Nov. 16, 1967, Ser. No. 683,633
Int. Cl. G01n 21/30
U.S. Cl. 250—219      10 Claims

ABSTRACT OF THE DISCLOSURE

A method for optically measuring the surface characteristics of fabric comprising illuminating the fabric, successively modifying the surface thereof to randomize it and transducing the light reflected from the randomized surface into electrical signals. An apparatus for optically scanning such a fabric having surface distortion of a relatively mobile character (e.g., pills) comprising (1) light source means to illuminate the fabric with a beam of light at substantially parallel incidence to the surface of the fabric, (2) means for positioning the beam at various vertical positions within the fabric, (3) fabric surface scanning means, (4) surface distortion orientation means for successively effecting topographical changes on the fabric surface and (5) wide angle lens photoelectric means for observing the fabric at normal incidence to the fabric surface and transducing the observed illumination to electrical signals. The electrical signals obtained are separated into "features" which may be determined by use of a learning-recognition system, which provides a correlation between measured values with subjective evaluations made by trained human judges.

SPECIFICATIONS

This invention relates to optical method and means for measurement of the surface characteristics of fabrics.

BACKGROUND OF THE INVENTION

Heretofore, optical scanners for use with web-type materials have been designed with little consideration being given to the effects of topographical changes which may occur in the fabric during the scanning interval or between successive scans. Such changes are due, for example, to rearrangement of individual fibers or groups of fibers capable of relative movement within the web under the influence of applied forces caused by handling or storage of the fabrics, such as might be experienced, for example, with napped fabrics or other materials in which the structure projects in a more or less vertically oriented manner above a generally horizontal substrate to produce a fuzzy-like effect. Such surfaces are primarily diffusors insofar as reflected lights are concerned and the subjective impression that is obtained by their visual perception has a varying quality that can be averaged out, although somewhat painstakingly, by the human eye. However, most electro-mechanically-operated scanners reading into photoelectric receptors do not average out such readings; quite different reflectance characteristics can be obtained with such equipment on the same fabric at two different times.

OBJECTS OF THE INVENTION

Accordingly, it is an object of this invention to provide an improved means and method for optical inspection that will enable more accurate classification of fabric appearance relative to subjective evaluations performed by visual means.

Another object of the invention is to provide an optical sensor system suitable for use with a learning-recognition system.

Another object of the invention is to provide an optical inspection means and method that is well adapted for use with fabrics which have a tendency to pill or otherwise form surface distortions of a relatively mobile character.

These and other objects will be evident from the following.

SUMMARY OF THE INVENTION

In accordance with the present invention there is provided a method for optically measuring the surface characteristics of fabric having surface distortion. The method comprises illuminating portions of the fabric, while successively applying forces to the surface of the illuminated fabric to effect topographical changes in the surface, and transducing the light reflected from the illuminated fabric to electrical signals. Thus, the present invention modifies the surface under inspection so as to produce a randomization of the surface effects produced by topographical changes and thereby obtains a more accurate characterization of the fabric.

The invention further provides means for optically scanning a fabric having surface distortion, at least some of which are relatively mobile. The means comprises (1) light source means means for illuminating portions of the fabric with a beam of light at substantially parallel incidence to the surface of the fabric, (2) beam displacement means for positioning the beam at various vertical positions within the fabric while maintaining the substantially parallel incidence, (3) scanning means for scanning the surface of the fabric by causing relative movement of the beam of light along the fabric surface, (4) surface distortion orientation means for successively effecting topographical changes on the fabric surface including vertical displacement of the relatively mobile surface distortions, and (5) wide angle lens photoelectric means for observing the illuminated fabric at normal incidence to the fabric surface and transducing the observed illumination to electrical signals.

An accurate and reproducible characterization of the fabric is thereby obtained.

The invention has important application in evaluating fabric having surface distortions. As used herein, the term "surface distortion" refers in general to surface variations of a fabric which are inherently or intentionally imparted to a fabric during weaving, knitting, or processing operations as well as in the end use of the fabric. The surface distortion may or may not add to the aesthetic appeal of the fabric and the term does not necessarily imply a defect. One important example of such surface distortion is "pilling" (the accumulation of small "balls" of fibers on the fabric surface). Another important example is "napped" fabric wherein fibers are raised from the fabric by teasels or a card clothing roller.

PREFERRED EMBODIMENTS OF THE INVENTION

The preferred method and means for illuminating the fabric utilizes a beam of light at substantially parallel incidence to the surface of the fabric. The beam preferably penetrates the surface of the fabric sample and may be visualized as a column of light as shown in FIG. 2. The beam is preferably monochromatic and focused. Monochromatic light is desired because the reflected light is more easily evaluated and changes in the fabric color are more easily compensated for (as will be fully discussed hereinafter). Viewing of the fabric at parallel incidence by a focused beam provides a combination of reproducibility with increased surface distortion (e.g., pill) resolution, which is highly desirable since pill count, or number of pills, is another factor taken into consideration in the rating of fabric samples. For this reason, a laser, focused for a spot size of 1/32 in., is a preferred source of illumination, for many purposes. The optimum degree of focus (i.e., the spot size) will depend upon the type of surface distortion one is most concerned with. The illumination obviously should not be so intense as to adversely affect the fabric sample. For example, a laser in the 0.5 to 10 milliwatt range does not adversely affect the fabric and is highly suitable; higher intensity illumination sources are generally not necessary or desired.

The fabric is preferably scanned by illuminating successive portions of the fabric by movement of the fabric and/or movement of the illumination along the fabric, preferably both. For example, the beam of light may be positioned at various vertical positions with reference to the fabric surface while maintaining the substantially parallel incidence. (The vertical position may be periodically or continuously changed.) The beam of light may be moved horizontally while in a fixed or varying vertical position along the surface of the fabric. Alternatively, while the beam of light is in a fixed or varying vertical position, the fabric sample is moved (preferably rotated) so that the successive portions of the fabric's surface are illuminated. Rotation is preferred for at least two reasons. Firstly, the effect of fabric construction is most adequately taken into account by illuminating it from all angles. Secondly the same surface distortion is also illuminated from more than one direction (i.e., a beam of light passes through the fabric surface, first illuminates one side of the surface distortion and then illuminates the other side of the same distortion when the sample has rotated 180° and the distortion is again in the beam of light).

The successive applications of force are preferably provided by pneumatic means which impinges a relatively high-velocity stream of compressed fluid (e.g. air at 15 p.s.i.g.) upon the surface of the fabric. Other surface distortion-orientation means can also be used, such as static charging of the fibers, or suctions. It is necessary that these means or other similar means successively effect topographical changes on the fabric. The applied forces should be sufficient to orient the relatively mobile surface distortions (e.g. pills) and effect their location on the fabric surface for greater and more accurate recognition. The force should not permanently distort the fabric surface; force (e.g. fluid stream velocity, static charge, etc.) in excess of that required for orientation of the pre-existing surface distortion is neither necessary nor desired. When force applications are done successively, the observed light more accurately characterizes the fabric, in that the feature signals derived from such observations may be averaged to eliminate "random noise." It is preferred that such electrostatic or pneumatic means be operatively connected in a synchronous manner to the optical scanner. This produces a reflectance characteristic which is in good agreement with visually-obtained data. It is preferred that signals be recorded during the intervals between successive applications of force. The force, while being applied, may itself create transient distortions in the fabric which preferably should not be measured.

The light reflected from the illuminated fabric is transduced into electrical signals, preferably by a wide angle lens photoelectric means which observes the fabric at normal incidence thereto. Processing of the signal produced by this scanning mechanism can be performed by any number of techniques well-known in the art; hence, no detailed description of optical signal-analysis techniques is given herein. However, it is preferred that the electrical signal be separated into individual feature signals as will be fully discussed hereinafter.

DRAWINGS

The invention will now be more completely described by reference to the following figures:

FIG. 3 is a schematic representation of a synchronous motor drive-pneumatic jet actuation system for use with the optical scanner of this invention.

FIG. 4 is a diagrammatic representation of a learning system suitable for use with the present invention.

FIG. 5 is a diagram of a recognizer or classifier of fabric samples having N distinguishing features as presented thereto by the optical scanner of the present invention and embodying data-reduction techniques utilizing automatic digital-recording equipment, e.g., a digital voltmeter.

FIG. 6(a) and (b) are a comparison of fabric sample rating as obtained with the present invention and by visual means.

FIG. 7 is a correlation for colored samples.

Figure 1:
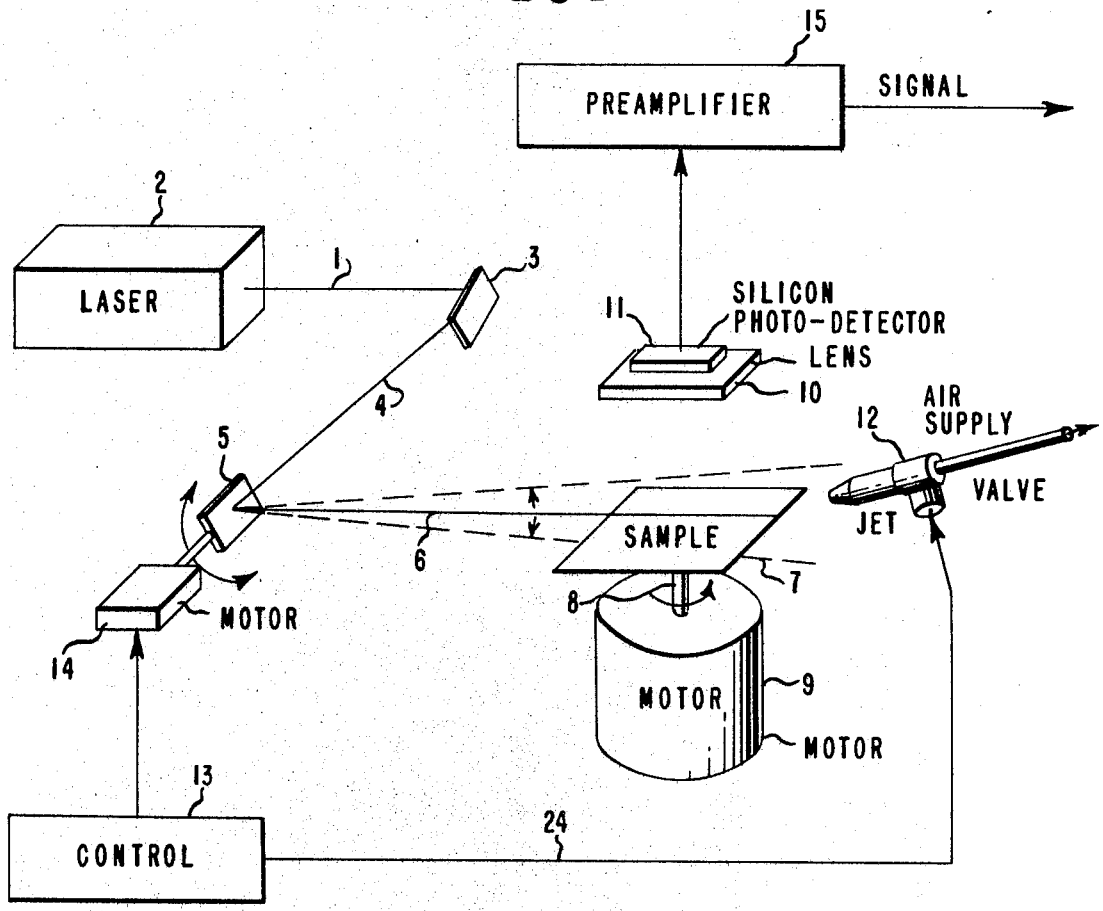
FIG. 1 is a diagram of a preferred embodiment of optical scanner in accordance with the invention.

Referring to FIG. 1, there is shown a preferred embodiment of the scanner of this invention. A beam 1 of focused, monochromatic, light, produced in this instance by a laser 2, is incident on a fixed flat mirror 3 at an angle to the normal thereof of 45°, from which it is reflected (in the plane containing beam 1 and that normal) along a line 4 to a mirror 5 rotatable through a small angle about an axis perpendicular to a generally horizontal line 6 parallel to beam 1. Beam 1 and lines 4 and 6, representative of the reflections thereof from mirrors 3 and 5, respectively, are contained in a plane perpendicular to the plane of a sample-mounting member 7 secured to the shaft 8 of an electric motor 9 for rotation of the sample as the reflected beam 6 from oscillating mirror 5 is deviated through a small (e.g., about 3/4°) equiangular travel, indicated by the dashed lines, above and below the plane of sample-mounting member 7 intersecting the junction of that member with shaft 8. Situated directly above member 7, for normal viewing thereof, is a wide angle lens 10 which images the illuminated portion of the sample on a photodetector 11. Disposed in angular relationship to sample-mounting member 7 and at a short distance therefrom is a pneumatic jet 12 providing a high-velocity stream of compressible fluid which impinges against the surface of the sample. Jet 12 is synchronously opened and closed by electronic control means 13 energizing motor 14 such that during downward movement of reflected beam 6 the sample surface is evenly ruffled or fluffed.

Figure 2:
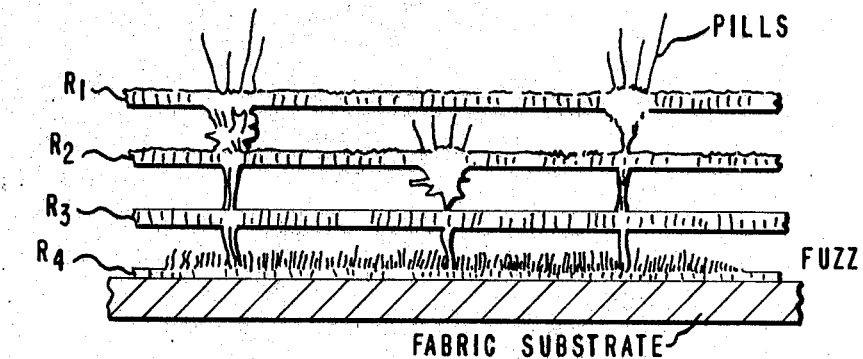
FIG. 2 is an enlarged view in cross section of a fabric sample scanned by the apparatus of this invention.

Referring to FIG. 2, there is shown in enlarged cross section a portion of a fabric containing three pills as traversed by the light beam 6 (beam 6 is shown at various times and designated $R_1$, $R_2$, $R_3$, and $R_4$ to correspond to the beam being vertical displaced or positioned within the fabric at substantially parallel incidence to the fabric substrate).

The reflected light transduced by photodetector 11 to electrical signals, is of a frequency and amplitude related to the surface characteristics of the fabric; the electrical signals correspond to the observed light. The signal produced by a pill in this apparatus is, in general, a function of (1) the rotational speed of sample-mounting member 7, (2) the size and density of the pill, (3) the location of the pill radially with respect to shaft 8, as well as (4) the vertical orientation of the pill. However, variations in the measurement of the last two-mentioned properties can obscure and make meaningless the integrated output of all of the others. In the subjective visual evaluation of pilled fabrics by trained personnel who do this on a full-time basis, the effect of the location of the pills is taken into account by manual fluffing of the fabric between viewings or individual pulling of each pill to raise the pills from the surrounding fuzzy surface. In the scanner of the present invention, this operation is simulated by the blowing action of jet 12 during half of the scan cycle which in effect changes the fabric's topography. The signals are preferably measured during the half of the scan cycle when the jet 12 is not on and these signals are separated into feature signals. Several measurements (e.g. over five or more scan cycles) are made and these feature signals are recorded and averaged to eliminate "random noise" and to present a more accurate representation of the sample. The effect of variation of the position of a pill of given diameter located near the axis of the sample-mounting member 7 is greater than an identical variation of a similarly sized pill located at a greater distance from the axis. Minimization of this effect can be obtained by interposing an appropriately sized circular mask between the sample and lens 10 or between lens 10 and photodetector 11, with a negligible reduction of scanned area. If desired, a second pneumatic jet can be symmetrically placed on the opposite side of sample-mounting member 7 for simultaneous operation with jet 12.

The beam from laser 2, which can be a Model 122 He-Ne gas laser manufactured by Spectra-Physics Corporation of Mountain View, Calif., is passed through an 868-mm. focal-length lens (not shown) producing a 1/32-in. spot with less 2% increase in spot size over the 4-in. depth of field (the transverse path along the scanned sample) obtained at a 17-in. spacing of mirror 5 from sample mount 7. Laser 2 can be powered by a Model 253 Spectra Physics exciter. Lens 10, located approximately 22 in. above the sample surface, is an 11-in. by 11-in. Fresnel lens of 5-in. focal length. The image of the scanned portion of the sample is focused onto a 1-in. diameter silicon solar cell 11, the signal output of which is fed to a conventional preamplifier circuit 15 from which it is passed to suitable automatic gain control (hereinafter AGC) circuitry prior to signal interpretation by recognition apparatus such as will be described with reference to FIG. 5. Motor 9, which turns at about 900 r.p.m., can be a synchronous motor manufactured by Bodine. With a 2-to-1 gear reduction system, it transmits its motions to the sample mount 7 at 450 r.p.m. Motor 14 is a limited-rotation motor such as that manufactured as T-3-025 by Mechanics for Electronics, Incorporated, Cambridge, Mass. It rotates through an angle of ±3/4°, being driven in synchronous fashion by controller 13 to actuate jet 12 through a solenoid valve, providing an air stream on the sample surface during the downward travel of mirror 5. Jet 12 is supplied with air at 15 p.s.i.g.

Without the presence of AGC circuitry, which has the primary function of compensating for different-colored samples, laser stability could become important, any frequency drift therefrom being the source of spurious signals not related to sample-surface disturbances and affecting signal reproducibility. However, this is adequately compensated for by the variable gain.

Mirror motor 14, being of the limited-rotation type, as hereinbefore described, produces a rotation proportional to input current; thus, triangular-waveform-generation circuitry having low deviation from linearity can be used in the motor-drive system contained in the block labeled "Control" in FIG. 1. A suitable circuit for this purpose comprises a Schmitt trigger 16 converting the 60-c./sec. sine-wave line frequency to a square-wave output for passage to a series of stable flip-flop circuits 17–20 providing frequency countdown through the development of corresponding phase-locked square waves. In this instance, a square-wave excitation at a frequency of 0.117 c./sec. is desired for subsequent integration and amplification into a triangular wave shaped by suitable operational amplifiers to produce the required drive signal for motor 14, all as is well-known in the art and shown schematically in FIG. 3.

Schmitt trigger 16 can be, typically, Type W-501 manufactured by Digital Equipment Corporation, of Maynard, Mass. Flip-flops 17 to 20 can, similarly, be modules R-202 manufactured by this same concern. Amplifiers 21, 22 and 23 can be, typically, Models 3007 and 3015, manufactured by Burr-Brown Corporation, Tucson, Ariz. Provision is made also for driving power amplifier 23 by an external input. Synchronous actuation of jet 12 is obtained from the square-wave output of the flip-flop 20, which is fed by line 24 through two stages of amplification 25 and 26 to a voltage-comparator circuit 27, held at a threshold value by potentiometer 28 until the square wave drives it above this level, whereupon a relay is energized controlling the solenoid valve which operates jet 12. At the same time, the square-wave output is used to actuate a sample-and-holding circuit relative to the output of the AGC circuit which follows preamplifier 15. Actuation takes place at the instant that beam 6 starts its upward scan and is held for a complete scan cycle. Thus, the reflected laser beam is sampled as beam 6 intercepts the fabric edge, providing a signal which is a measure of color but independent of pilliness.

The continuously changing surface characteristics of the fabric are more uniformly presented as a light-reflectance pattern to a signal interpretation apparatus. It is highly desired that such an interpretation apparatus "learn" the features that are subjectively taken into account by expert human judges in evaluating fabric sample. Although some features (e.g., pill count, pill size) are objectively considered by human judges, many of such features are subjective. A preferred approach to this problem is to optically scan a series of samples previously evaluated by human judges and placed in order of "goodness". The electrical signals derived in the scanning operation are separated into features which may be significant, e.g., frequency content, amplitude statistics, energy (area under the frequency or amplitude v. time curve), pill count. These features are then evaluated to determine which features are of primary interest (i.e., which features correlate to the human ratings of "goodness"). These features of primary interest are used for evaluating that type of fabric. This concept will be more fully understood by the following discussion in reference to FIGS. 4 and 5:

Referring now to FIGURE 4, a typical learning-recognition system network is shown comprising decision elements which operate on input data from the optical sensor of this invention so as to provide a desirable output response; that is, the important fabric characteristics (features) must be first "learned" so that a recognition or measurement model can be produced. An error-correcting scheme is used for adjusting the weights applied to the various fabric features $F_1, F_2, \ldots, F_N$. The learning function is provided by the comparator, which recursively adjusts the values of the weights through an interative training procedure to minimize the error of some function thereof between the modified output of the feature extractor and some desired output determined by subjective analysis of reference fabric samples provided by a group of experts. Upon determination by this convergence method of the desired weights representative of a suitable measurement model, a recognition system instrument, depicted schematically in FIG. 5, can be specified and combined with suitable data-reduction equipment to produce a readout in terms of one number, which serves as a "goodness" index, providing a measure of fabric acceptability.

Since each fabric feature gives rise to signals of various frequencies and amplitudes, as detected by the optical sensor of this invention, suitable feature-extraction means could be comprised, for example, of a plurality of band-pass filters, one or a combination of filters for each feature, each filter having a passband responsive to the frequencies associated with that feature. All of the filters could be coupled in parallel to the optical sensor, the output of each filter being demodulated and applied to an appropriate weighting circuit $W_1, W_2, W_3 \ldots W_N$, determined by the learning procedure, so that the sensor input is compared to the measurement model provided by the aforementioned learning procedure. The N weighted outputs are then applied to a summing device for ultimate data reduction to a numerical product rating.

Illustrative of the kind of results that can be obtained with the combined pneumatic-optical sensor-learning recognition system of this invention, a comparison is made in FIGS. 6(a) and (b) of pill ratings as determined by "machine" rating and by human rating. In each case, three independent ratings were made of samples which were approximately 4 in. square and, with the exception of the degree of pilling, were of basically the same general fabric type. Each sample had been first assigned a subjective training rating based on a rating system in which each human judge is presented with a succession of pairs of samples and asked to select which of each pair is the better sample. Each sample appears with every other sample a number of times based on a statistically designed experiment and is given a point whenever it appears better than its partner. The results of this procedure are manipulated mathematically to produce a linear ranking of sample preference (shown as a scale from 0 to 100 in the abscissas of the plots in FIGS. 6(a) and (b)). Following the assignment of training ratings and the specification of a recognition model, the samples were presented at three different times for rating both by a single human judge and by the recognition machine comprised of the pneumatic-optical sensor and a 5-feature model comprising four band-pass filters and a signal representative of pill count. comparing the results shown in FIGS. 6(a) and (b), it will be seen that the "machine" ratings provide a consistently good correlation with training ratings, whereas ratings performed by selected individual judges do not correlate nearly as well with the training ratings.

FIG. 7 shows a correlation obtained with colored samples employing the feature of automatic gain control to compensate for color differences. No basic changes were made in the recognition model. Ratings of the samples as supplied by human judges who do this as a routine matter are the abscissa values, with the "machine" ratings being given as the ordinate values.

The foregoing has described preferred embodiments of the present invention and it is apparent that various modifications may be made therein within the spirit and scope of the invention. Therefore, it is to be understood that the invention is limited only as defined in accordance with the following claims.

What is claimed is:

1. Process for optically measuring the surface characteristics of a fabric having surface distortion comprising:
   (1) illuminating portions of said fabric with a beam of light at substantially parallel incidence to the surface of said fabric while positioning said beam of light at a plurality of different points spaced vertically within said fabric,
   (2) successively applying force to the surface of the illuminated fabric to effect topographical changes in said surface, and
   (3) transducing the light reflected from said illuminated fabric to electrical signals.

2. Process for optically measuring the surface characteristics of a fabric having surface distortion according to claim 21 wherein said beam of light is continuously traversed within said fabric in a preselected direction vertically during application of said force to said surface of said illuminated fabric and in the opposite vertical direction in the intervals between successive applications of force, said applications of said force being by impingement of a stream of compressed fluid upon the surface of said fabric.

3. Apparatus for optically scanning a fabric having surface distortion, at least some of said surface distortion being relatively mobile, comprising:

(1) light source means for illuminating portions of said fabric with a beam of light at substantially parallel incidence to the surface of said fabric,
(2) beam displacement means for positioning said beam at various vertical points within said fabric while maintaining said substantially parallel incidence,
(3) scanning means for scanning the surface of said fabric by causing relative movement of said beam of light along said fabric surface,
(4) surface distortion orientation means for successively effecting topographical changes on said fabric surface including vertical displacement of the surface distortion, and
(5) wide angle lens photodetector means imaging the illuminated fabric at normal incidence to said fabric surface and transducing light reflected from said illuminated fabric to electrical signals.

4. Apparatus as defined by claim 3 wherein said wide angle lens photodetector means images the illuminated fabric during the successive topographical changes in said fabric surface and transduces reflected light to corresponding electrical signals during the interval between the successive topographical changes, the average of said corresponding electrical signals being characteristic of the randomized topographical surface of said fabric.

5. Apparatus as defined by claim 3 further comprising means providing a measure of the color of said fabric and compensating for said color by appropriately adjusting said electrical signals transduced by said photodetector means.

6. Apparatus as defined by claim 3 wherein said beam of light is a focused and monochromatic laser beam and said scanning means rotates said fabric so that successive portions of said fabric along the surface thereof are illuminated by said beam.

7. Apparatus as defined by claim 1 wherein said surface distortion orientation means is a pneumatic jet which impinges a high-velocity stream of compressible fluid upon the surface of said fabric, the impingement being synchronized with said beam displacement means to illuminate the successively changing topographical surface of said fabric.

8. Apparatus as defined by claim 3 further comprising electrical signal extracting means separating said electrical signals into individual feature signals.

9. Apparatus as defined by claim 3 in combination with a learning-recognition system.

10. Apparatus as defined by claim 3 in combination with a recognition system.

References Cited

UNITED STATES PATENTS

| | | |
|---|---|---|
| 2,803,161 | 8/1957 | Summerhayes _____ 250—224 X |
| 2,812,447 | 11/1957 | Mac Martin et al. |
| 3,072,012 | 1/1963 | Pandell et al. |
| 3,174,046 | 3/1965 | Lindeman et al. |
| 3,388,261 | 6/1968 | Roberts et al. ___ 356—238 XR |
| 3,405,552 | 10/1968 | Luckett _____ 73—159 XR |

OTHER REFERENCES

Kelling, "Problems, Solutions in Photoelectric Web Scanning", Modern Converter, May 20, 1964, pp. 22–23.

RALPH G. NILSON, Primary Examiner

C. M. LEEDOM, Assistant Examiner

U.S. Cl. X.R.

73—159; 250—224; 340—259; 356—238

PO-1050
(5/69)

UNITED STATES PATENT OFFICE
CERTIFICATE OF CORRECTION

Patent No. 3,524,988      Dated August 18, 1970

Inventor(s) P. H. GAITHER IV

It is certified that error appears in the above-identified patent and that said Letters Patent are hereby corrected as shown below:

Column 7, line 62, "claim 21" should read -- claim 1 -- .

Column 8, line 37, "claim 1" should read -- claim 3 -- .

SIGNED AND
SEALED
NOV 3 1970

(SEAL)
Attest:

Edward M. Fletcher, Jr.
Attesting Officer

WILLIAM E. SCHUYLER, JR.
Commissioner of Patents